(12) United States Patent
Mo et al.

(10) Patent No.: US 12,337,912 B2
(45) Date of Patent: Jun. 24, 2025

(54) VEHICLE PANEL ASSEMBLY

(71) Applicants: Hyundai Motor Company, Seoul (KR); Kia Corporation, Seoul (KR)

(72) Inventors: Jin Young Mo, Hwaseong-si (KR); Hyun Cheol Yun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 406 days.

(21) Appl. No.: 17/873,881

(22) Filed: Jul. 26, 2022

(65) Prior Publication Data
US 2023/0249766 A1    Aug. 10, 2023

(30) Foreign Application Priority Data
Feb. 9, 2022   (KR) .................. 10-2022-0016746

(51) Int. Cl.
*B62D 65/16*   (2006.01)
*B62D 25/02*   (2006.01)
*B62D 27/06*   (2006.01)

(52) U.S. Cl.
CPC ............ *B62D 65/16* (2013.01); *B62D 25/02* (2013.01); *B62D 27/065* (2013.01)

(58) Field of Classification Search
CPC ...... B62D 65/16; B62D 25/02; B62D 27/065; B62D 27/02; B62D 27/04; B62D 23/005; B62D 25/00; B62D 27/023; B62D 25/08; B62D 25/20; B60Y 2306/01
See application file for complete search history.

(56) References Cited

U.S. PATENT DOCUMENTS

| | | | | |
|---|---|---|---|---|
| 4,824,157 A * | 4/1989 | Nielsen | ..................... | B60P 7/02 296/10 |
| 6,457,768 B1 * | 10/2002 | Schroeder | ............ | B62D 29/043 296/214 |
| 9,718,498 B1 * | 8/2017 | Faruque | ............... | B62D 29/046 |
| 2006/0017303 A1 * | 1/2006 | Weege | ..................... | B60J 7/062 296/105 |
| 2010/0026037 A1 * | 2/2010 | Opie | ........................ | B60J 7/062 296/100.18 |
| 2021/0171116 A1 * | 6/2021 | Yun | ..................... | B62D 23/005 |

FOREIGN PATENT DOCUMENTS

| | | |
|---|---|---|
| KR | 20160003186 A | 1/2016 |
| WO | WO-2021087209 A1 * | 5/2021 ............. B60J 7/026 |

* cited by examiner

*Primary Examiner* — Jason D Shanske
*Assistant Examiner* — Sara Laghlam
(74) *Attorney, Agent, or Firm* — Slater Matsil, LLP (57) ABSTRACT

An embodiment vehicle panel assembly includes an inner panel configured to be coupled to a vehicle body that includes a plurality of pipes, the inner panel including a first coupling part fitted at an end thereof, and a reinforcing panel including a second coupling part coupled to the first coupling part and a fastening part extending toward a reinforcing pipe configured to be coupled to the vehicle body to reinforce the vehicle body, wherein the reinforcing panel is coupled to the inner panel through the second coupling part, and the fastening part is fitted with the reinforcing pipe to connect the inner panel and the reinforcing pipe.

20 Claims, 11 Drawing Sheets

VEHICLE PANEL ASSEMBLY

CROSS-REFERENCE TO RELATED APPLICATIONS

This application claims the benefit of Korean Patent Application No. 10-2022-016746, filed on Feb. 9, 2022, which application is hereby incorporated herein by reference.

TECHNICAL FIELD

The present disclosure relates to a technology for a panel assembly.

BACKGROUND

A general vehicle body structure is fabricated by processing and welding parts through press working using a die, so there is a problem in that the vehicle body structure requires large-scale facility investment such as a press factory, a vehicle body welding plant, and a painting plant, as well as a low degree of freedom in design.

In particular, there is a problem in that the existing vehicle body requires a lot of design changes during small quantity batch production, and accordingly, the number of dies is also drastically increased, which inevitably increases the production cost.

In order to respond in a timely manner to the rapidly changing market environment and customer needs, it is necessary to simplify vehicle production and minimize the development period.

Accordingly, there is a demand for a vehicle body structure that can respond to various designs and has improved assembly properties of the body in a smart factory environment.

In addition, it is necessary to reduce costs and simplify manufacturing through common use of parts.

The foregoing is intended merely to aid in the understanding of the background of the present disclosure, and is not intended to mean that the present disclosure falls within the purview of the related art that is already known to those skilled in the art.

SUMMARY

The present disclosure relates to a technology for a panel assembly. Particular embodiments relate to a technology for an inner panel assembly that is coupled to an upper body of a vehicle body and to which an outer panel is externally coupled.

Accordingly, embodiments of the present disclosure have been made keeping in mind problems occurring in the related art, and an embodiment of the present disclosure provides a vehicle panel assembly coupled to a vehicle body including a plurality of pipes.

According to an embodiment of the present disclosure, there is provided a vehicle panel assembly including an inner panel coupled to a vehicle body configured by coupling a plurality of pipes and having a first coupling part capable of being fitted at an end thereof and a reinforcing panel having a second coupling part coupled to the first coupling part and a fastening part extending toward a reinforcing pipe coupled to the vehicle body for reinforcing the vehicle body, wherein the reinforcing panel is coupled to the inner panel through the second coupling part, and the fastening part is fitted with the reinforcing pipe to connect the inner panel and the reinforcing pipe.

The inner panel may be coupled to the vehicle body by bolting or riveting.

The first coupling part may be recessed into the vehicle body, and the second coupling part may protrude to correspond to a recessed shape of the first coupling part, so that the second coupling part is inserted and fitted into the first coupling part.

The vehicle body may be formed by combining an upper body formed of a plurality of pipes, a lower body formed of a plurality of pipes, and a reinforcing pipe configured to reinforce the upper body, wherein the inner panel is coupled to the upper body, and the reinforcing panel connects the reinforcing pipe and the inner panel.

The reinforcing pipe may have an opening portion with one side opened so as to be coupled to the vehicle body, and the fastening part may be inserted into and fastened to the opening portion of the reinforcing pipe.

The reinforcing pipe may include an extension extending from an end of the opening portion, and the fastening part may include a first fastening portion having an engaging step inserted into the opening portion so as to be caught by the extension.

An outer surface of the first fastening part may be formed to be inclined in the insertion direction.

The extensions may be formed in a pair at both ends of the opening portion in a direction crossing the longitudinal direction of the reinforcing pipe, and the first fastening portions may be formed in a pair to correspond to the pair of extensions for mutual engagement.

The fastening part may include a second fastening portion having a protrusion extending in a direction crossing the longitudinal direction of the reinforcing pipe so as to be inserted into the opening portion, and the reinforcing pipe may include a through-hole into which an end of the second fastening portion is inserted at a surface opposite to the opening portion.

The second fastening portion may further include a support portion protruding from the side of the reinforcing panel to a width greater than that of the opening portion and supported by the reinforcing pipe, and the protrusion may extend from an end of the support portion.

The fastening part may include a third fastening portion formed to partially surround an outer circumferential surface of the reinforcing pipe so that the reinforcing pipe is inserted and fastened to the inside of the reinforcing pipe.

According to embodiments of the present disclosure, the vehicle panel assembly includes the reinforcing pipe coupled around the vehicle body made of pipes for reinforcing the vehicle body, and the reinforcing panel connecting the inner panel coupled to the vehicle body and the reinforcing pipe to improve the coupling force between the vehicle body, the reinforcing pipe, and the inner panel, thereby reinforcing the vehicle body to surround the exterior of a vehicle body made of a pipe.

In addition, the vehicle body, the reinforcing pipe, the inner panel, and the reinforcing panel can be combined by bolting, riveting, or fitting, and this assembly method can simplify the manufacturing process in which each panel is manufactured and transported to a smart factory, is assembled into a vehicle by a simple coupling method such as fitting, bolting, or riveting in the smart factory without a manufacturing process such as a press process and a painting process and is finally delivered to the customer, thereby minimizing the manufacturing cost.

DETAILED DESCRIPTION OF ILLUSTRATIVE EMBODIMENTS

Specific structural or functional descriptions of the embodiments of the present disclosure disclosed herein are merely exemplified for the purpose of illustrating the embodiments according to the present disclosure, and the embodiments of the present disclosure are implemented in various forms, and may not be construed as being limited to the embodiments described in this specification or application.

Since the embodiments according to the present disclosure can be diversely modified into various forms, specific embodiments will be illustrated and described in detail in the drawings and the description of the present disclosure. However, this is not intended to limit the embodiments according to the concept of the present disclosure to specific disclosure forms, but should be understood to include all modifications, equivalents, or substitutes included in the spirit and scope of the present disclosure.

It will be understood that although the terms "first", "second", etc. may be used herein to describe various elements, these elements should not be limited by these terms. These terms are only used to distinguish one element from another element. Thus, a first element discussed below could be termed a second element and vice versa without departing from the nature of the present disclosure.

It will be understood that when an element is referred to as being "connected" or "coupled" to another element, it can be directly connected or coupled to the other element or intervening elements may be present therebetween. In contrast, when an element is referred to as being "directly connected" to another element, there are no intervening elements present. Other expressions describing the relationship between the components, such as "between" and "immediately between" or "neighboring" and "directly neighboring" should also be interpreted in the same manner.

The terminology used herein is for the purpose of describing particular embodiments only and is not intended to limit the invention. As used herein, the singular forms "a", "an", and "the" are intended to include the plural forms as well, unless the context clearly indicates otherwise. It will be further understood that the terms "comprises" and/or "comprising", or "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

Unless otherwise defined, the meaning of all terms including technical and scientific terms used herein is the same as that commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

A preferred embodiment of the present disclosure will now be described in detail with reference to the accompanying drawings. Like reference numerals indicate like elements throughout the drawings.

Relatively long producing processes and producing expenses are required to provide vehicles with all of a suspension, an exterior, an interior, a steering system, a safety system, etc. in consideration of driving comfort, safety specification, appearance beauty, traveling performance, etc. for passengers. In addition, since individual vehicles should be manufactured for respective uses, there is a problem in that the vehicles are not manufactured to be suitable for use in a customized type.

The vehicles to which technology based on embodiments of the present disclosure is applied relate to business vehicles having various commercial purposes, such as physical distribution, food trucks, delivery, servicing, and so on, among purpose built vehicles (PBVs). In the case of the illustrated embodiments, a vehicle is illustrated which can be driven through an autonomous driving system with only goods loaded in an internal space for transportation, and which is used for unattended delivery, physical distribution, and delivery systems of freights or foods.

This vehicle based on embodiments of the present disclosure is simplified in structure, so that its design and manufacturing can be simplified. Parts for this vehicle are modularized and made in common use, thereby facilitating saving of costs, and supply and demand of the parts. The modularized parts for this vehicle have an advantage in that the vehicle can be completed only by mechanical coupling such as bolting (not shown) or riveting (R) through a press process, a vehicle body 100 welding process, and an eco-friendly environment smart factory production process without no painting process.

Figure 11:
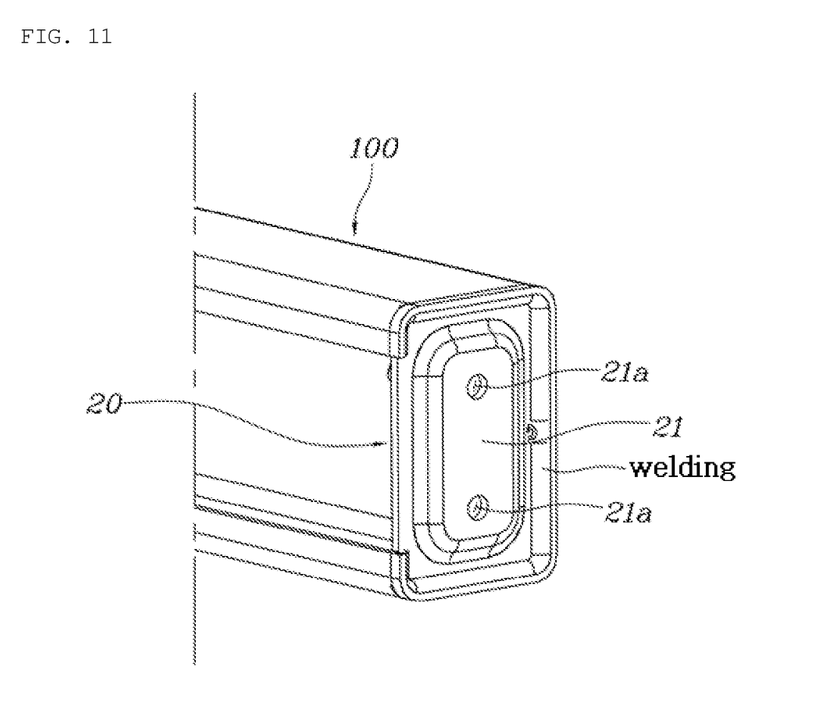
FIG. 11 is a perspective view illustrating a state in which a coupling member 20 is coupled to ends of the pipes constituting a vehicle body according to an embodiment of the present disclosure.

Embodiments of the present disclosure can configure a vehicle with a plurality of pipes in order to reduce manufacturing costs. The pipe can be manufactured through extrusion, roll forming, etc., so there is an advantage in that the manufacturing costs are low, but a method is required for reinforcing of coupling strength when ends of the pipes are coupled with other pipes or panels. Therefore, in the case of embodiments of the present disclosure, a coupling member 20 for closing an open end of the pipe may be applied to allow an end of the pipe to be strongly coupled with another pipe or panel and to suppress the deformation to the open end of the pipe, and a coupling surface 21 having a coupling hole 21*a* may be provided for coupling with another component. As illustrated in FIG. 11, the coupling member 20 is welded at a distance separated inwardly from the end of the pipe in a lengthwise direction of the pipe, and weld beads are formed in a separated space in which the coupling member 20 is formed by inward separation from the pipe. Thereby, finishing work of the weld beads can be excluded, and thus integrating work of the coupling member 20 can be simplified. According to this structure in which the pipe and the coupling member 20 of embodiments of the present disclosure are integrated, there is an advantage in that the vehicle body can be easily assembled only by mechanical coupling such as bolting or riveting at an eco-friendly smart factory, is eco-friendly due to unnecessity of welding or the like, some members of the vehicle body are easily exchanged after being in an accident or when repaired and maintained, and a variety of vehicles can be easily assembled and produced.

In the vehicle to which embodiments of the present invention is applied, a business region on which freight is loaded and a drive region which is in charge of vehicle driving may be divided. The business region may be variously changed according to a demand of a customer, and the drive region may be various changed according to a drive condition.

In the illustrated embodiments, the vehicle is basically designed in a structure in which a space in which a door is opened only to one side and freight can be loaded is opened, and the business region may be designed in various shapes according to a demand of the customer.

An upper body 110 of a vehicle according to embodiments of the present disclosure constitutes a vehicle body 100 located in the business area of a vehicle for an unmanned delivery system.

An upper body 110 and a lower body 120 are assembled by bolting (not shown), etc. through a plurality of pipe-shaped members, so that manufacturing, repair and rebuilding are easy. The lower part of the upper body 110 constitutes the floor, and a driving motor, a wheel, a suspension, a battery, etc. may be mounted on the front and rear sides of the lower body 120. In addition, an additional battery may be mounted or a cargo space may be configured in the center of the lower body 120. Further, the upper body 110 and the lower body 120 are respectively assembled and then vertically fastened to each other to constitute a vehicle body 100 of the completed vehicle. Therefore, various combinations of the upper body 110 and the lower body 120 can be assembled.

A vehicle to which embodiments of the present disclosure is applied is configured such that a vehicle body thereof is constituted by coupling a plurality of pipes, an inner panel 200 is coupled to the upper body 110, which is a business area of the vehicle body 100, and an outer panel (not shown) forming the exterior of a vehicle may be externally assembled around the inner panel 200.

Figure 1:
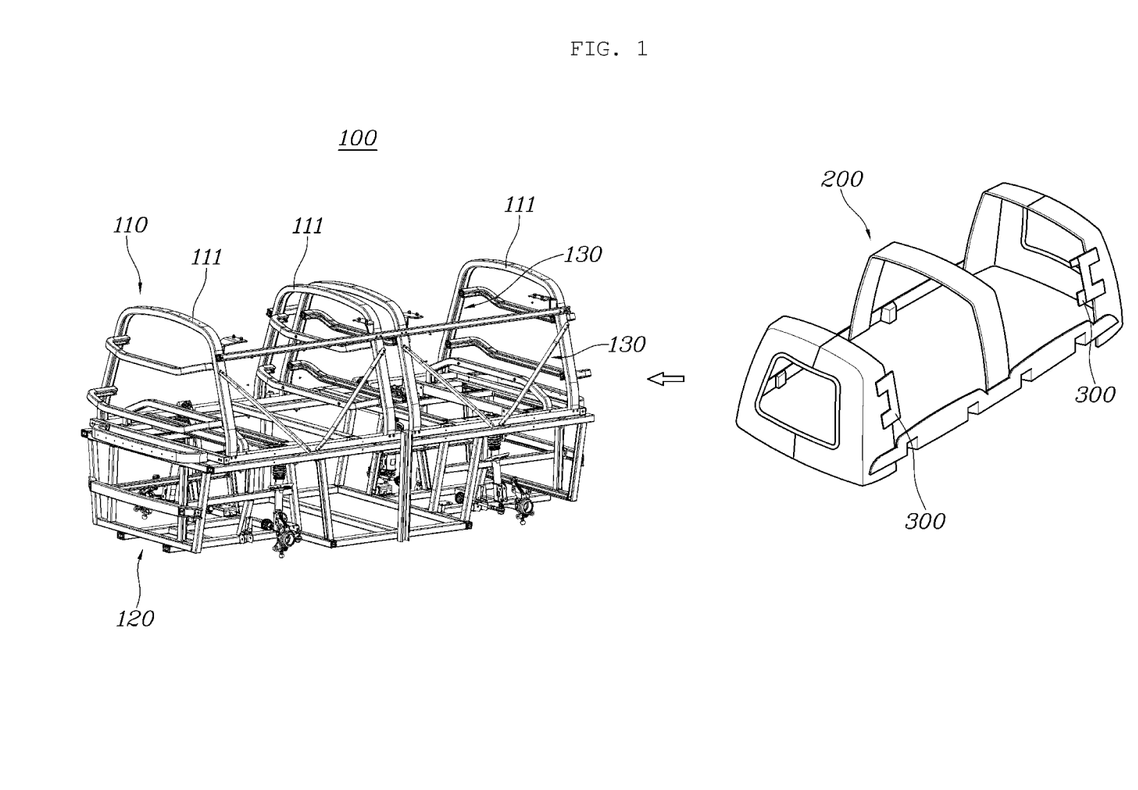
FIG. 1 is a view illustrating a vehicle body, an inner panel, and a reinforcing panel according to an embodiment of the present disclosure.
Figure 2:
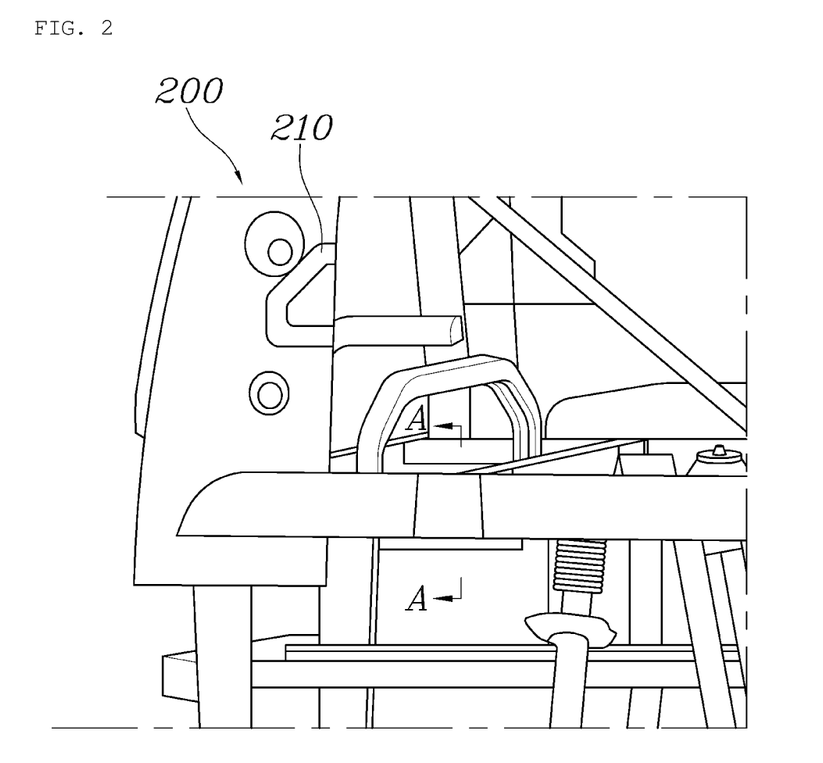
FIG. 2 is an enlarged perspective view of an inner panel coupled to a vehicle body according to an embodiment of the present disclosure.
Figure 3:
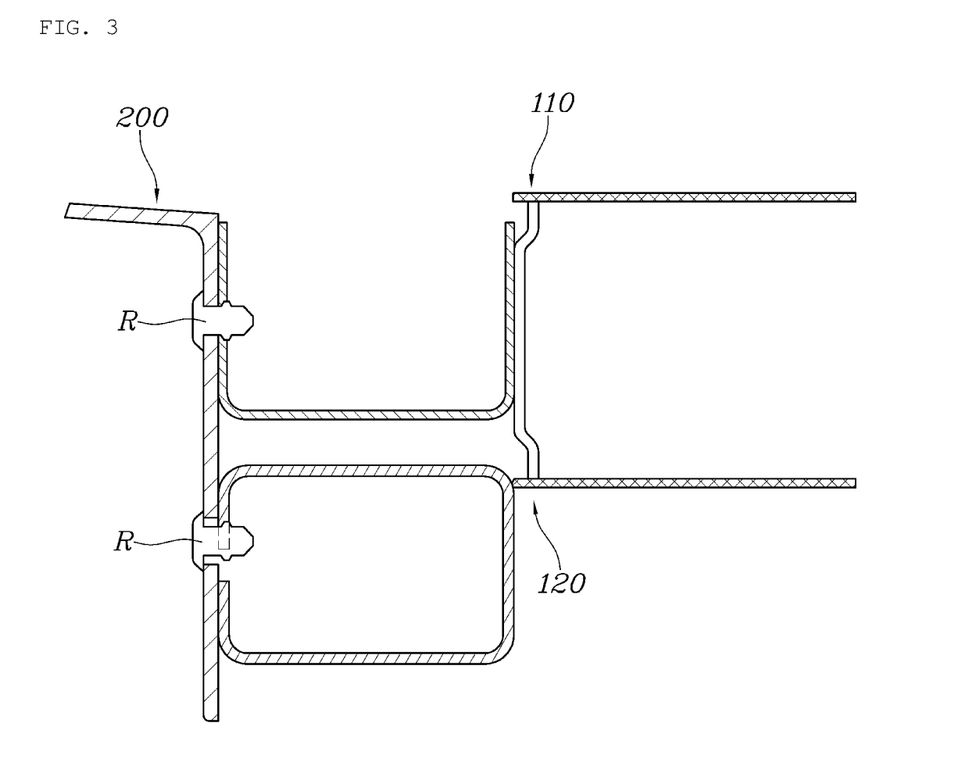
FIG. 3 is a cross-sectional view taken along line A-A of FIG. 2.
Figure 4:
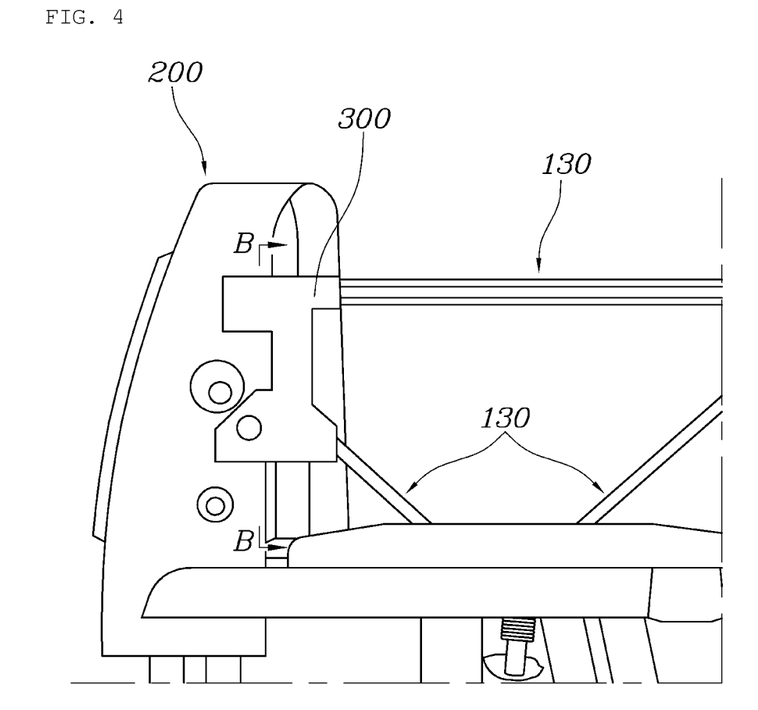
FIG. 4 is a perspective view illustrating the reinforcing panel connecting the inner panel and the reinforcing pipe according to an embodiment of the present disclosure.
Figure 5:
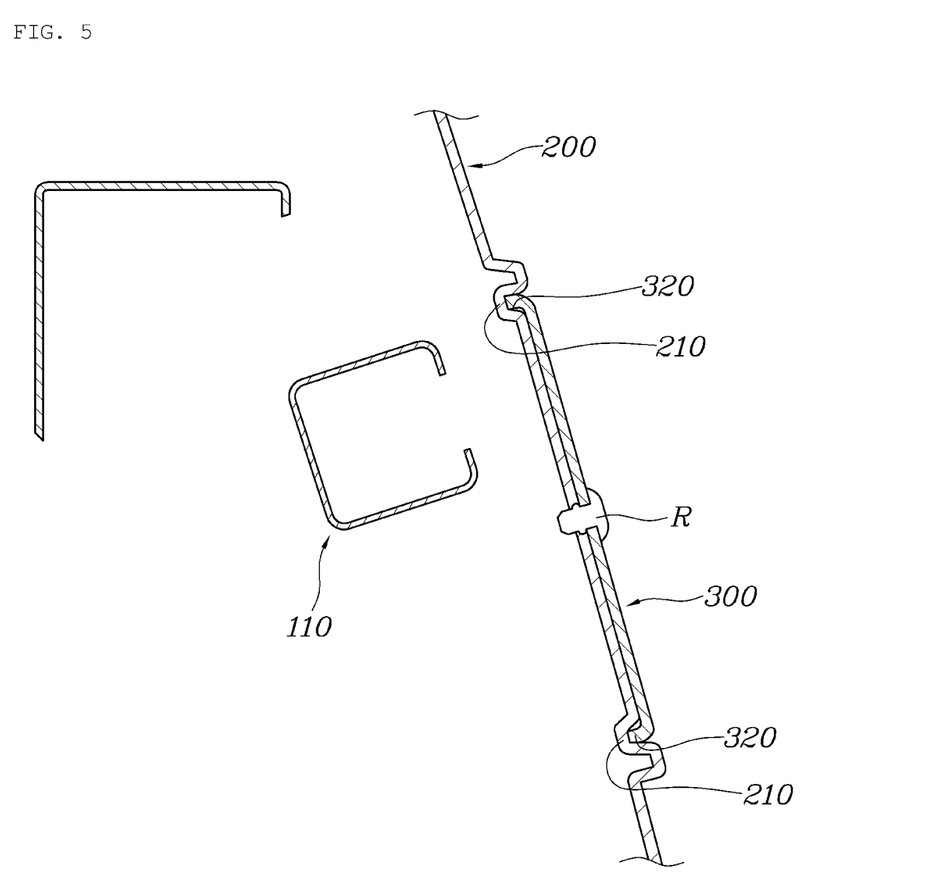
FIG. 5 is a cross-sectional view taken along line B-B of FIG. 4.

FIG. 1 is a view illustrating a vehicle body 100, an inner panel 200, and a reinforcing panel 300 according to an embodiment of the present disclosure, FIG. 2 is an enlarged perspective view illustrating the inner panel 200 coupled to the vehicle body 100 according to an embodiment of the present disclosure, FIG. 3 is a cross-sectional view taken along line A-A of FIG. 2, FIG. 4 is a perspective view illustrating the reinforcing panel 300 connecting the inner panel 200 and a reinforcing pipe 130 according to an embodiment of the present disclosure, and FIG. 5 is a cross-sectional view taken along line B-B of FIG. 4.

A vehicle panel assembly according to a preferred embodiment of the present disclosure will now be described with reference to FIGS. 1 to 5.

The vehicle panel assembly according to embodiments of the present disclosure includes an inner panel 200 coupled to a vehicle body 100 configured by coupling a plurality of pipes and having a first coupling part 210 capable of being fitted at an end thereof and a reinforcing panel 300 having a second coupling part 320 coupled to the first coupling part 210 and a fastening part 310 extending toward a reinforcing pipe 130 coupled to the vehicle body 100 for reinforcing the vehicle body 100, wherein the reinforcing panel 300 is coupled to the inner panel 200 through the second coupling part 320, and the fastening part 310 is fitted with the reinforcing pipe 130 to connect the inner panel 200 and the reinforcing pipe 130.

As illustrated in FIGS. 1 to 3, the vehicle body 100 is provided to be formed of a plurality of pipes, and the pipes may be coupled to one another by bolting (not illustrated).

Specifically, the vehicle body 100 may be formed by combining an upper body 110 formed of a plurality of pipes, a lower body 120 formed of a plurality of pipes, and a reinforcing pipe 130 configured to reinforce the upper body 110, wherein the inner panel 200 is coupled to the upper body 110, and the reinforcing panel 300 connects the reinforcing pipe 130 and the inner panel 200.

The lower body 120 of the vehicle body 100 is formed of a pipe, and is coupled with a vehicle driving system to form a lower portion of the vehicle body 100. The driving system may include a suspension, wheels, a motor, a battery, and so on, and the lower body 120 may form a lower frame of the vehicle body 100, and a bumper.

The upper body 110 of the vehicle body 100 may include a base frame that is coupled with the lower body 120 toward below, and pillar members 111 that connect the side sections of the base frame and are bent to protrude upward.

The plurality of pillar members 111 may be disposed above the base frame in a forward/backward direction of the vehicle, and a luggage box in which freight can be loaded may be mounted between the pillar members 111.

The vehicle body 100 may be provided with the reinforcing pipe 130 that extends in a pipe form in order to reinforce the pillar member in, interconnects the plurality of pillar members 111, or connects the pillar members 111 and the base frame.

The inner panel 200 is formed of a plurality of panels, may be coupled to the vehicle body 100, can cover front and rear surfaces and sides of the vehicle body boo, and can cover the outside of the pillar members.

Further, the outer panel is coupled to an outside of the inner panel 200, so that an exterior of the vehicle can be formed.

Figure 6:
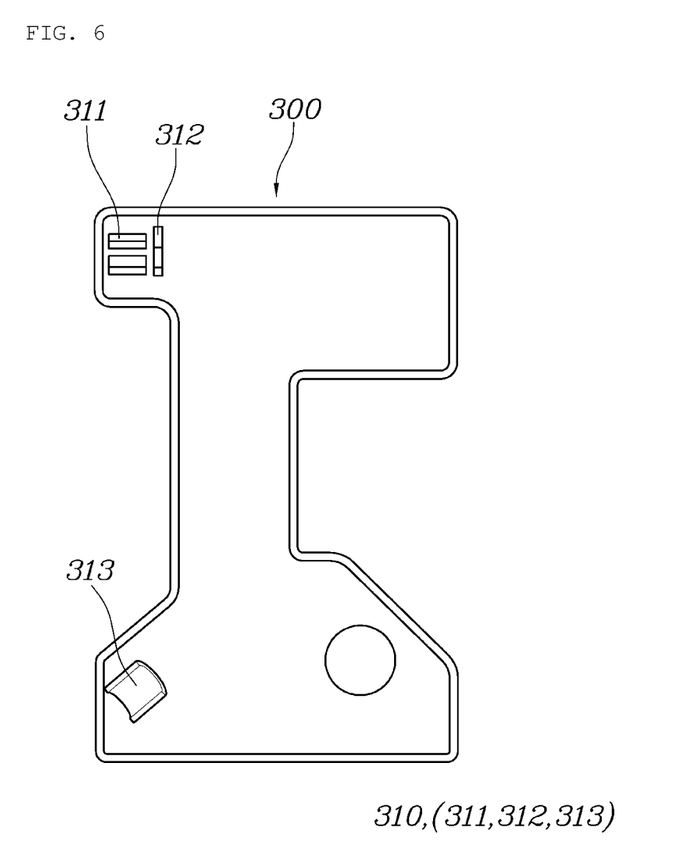
FIG. 6 is a rear view illustrating a reinforcing panel according to an embodiment of the present disclosure.

As illustrated in FIGS. 5 and 6, a first coupling part 210 that can be fitted is provided at one side of the inner panel 200, and a second coupling part 320 is provided at one side of the reinforcing panel 300 so as to be fitted corresponding to the first coupling part 210. Thus, the inner panel 200 and the reinforcing panel 300 can be easily coupled to each other by fitting.

Further, the other side of the reinforcing panel 300 extends in a direction in which the reinforcing pipe 130 extends. At an end of the other side of the reinforcing panel 300, the fastening part 310 is formed to allow fitting with the reinforcing pipe 130. Thus, by an external force of a worker, the reinforcing panel 300 is coupled to the reinforcing pipe 130 and the inner panel 200, so that the reinforcing pipe 130 and the inner panel 200 can be connected, thereby providing the effect that the reinforcing pipe and the inner panel can be easily coupled without a separate process such as bolting (not illustrated), riveting (R), or welding.

The inner panel 200 may be coupled to the vehicle body 100 by bolting (not illustrated) or riveting (R).

As illustrated in FIG. 3, the inner panel 200 is brought into contact with the upper body 110 and the lower body 120 formed of a plurality of pipes, and can be coupled by mechanical coupling such as bolting (not illustrated) or riveting (R).

Accordingly, the inner panel 200 can be easily coupled to or decoupled from the vehicle body 100. Thus, there is an effect in that work for repairing or exchanging the inner panel 200 is facilitated, and a worker can easily couple the inner panel 200 at a smart factory due to an absence of the welding process.

The first coupling part 210 is recessed inward, and the second coupling part 320 protrudes to correspond to a shape in which the first coupling part 210 is recessed. The second coupling part 320 can be inserted and fitted into the first coupling part 210.

As illustrated in FIG. 5, as one embodiment of the first coupling part 210 and the second coupling part 320, the second coupling part 320 may be formed to extend outward from one end of the inner panel 200 along an end, and the first coupling part 210 is recessed along a shape in which the second coupling part 320 protrudes. Thus, the second coupling part 320 may be inserted into the first coupling part 210, and the reinforcing panel 300 can be fitted outside the inner panel 200.

Thus, the inner panel 200 is first coupled to the vehicle body 100 by bolting (not illustrated) or riveting (R). Then, the reinforcing panel 300 is coupled to the inner panel 200, so that the inner panel 200 and the reinforcing pipe 130 can be connected together.

FIG. 6 is a rear view of the reinforcing panel 300 according to an embodiment of the present disclosure.

The reinforcing pipe 130 is coupled to the vehicle body 100 after an opening portion 132 whose one side is open is formed, and the fastening part 310 is inserted into the opening portion 132 of the reinforcing pipe 130, and can be fastened with the reinforcing pipe 130.

In an embodiment, the fastening part 310 may be formed on the other side of the reinforcing panel 300 so as to be connected to the reinforcing pipe 130.

The reinforcing pipe 130 is formed from an open-ended pipe, and the fastening part 310 is fitted into the reinforcing pipe 130 in an easy-connection manner.

Hereinafter, embodiments of the various fastening parts 310 will be described.

Figure 7:
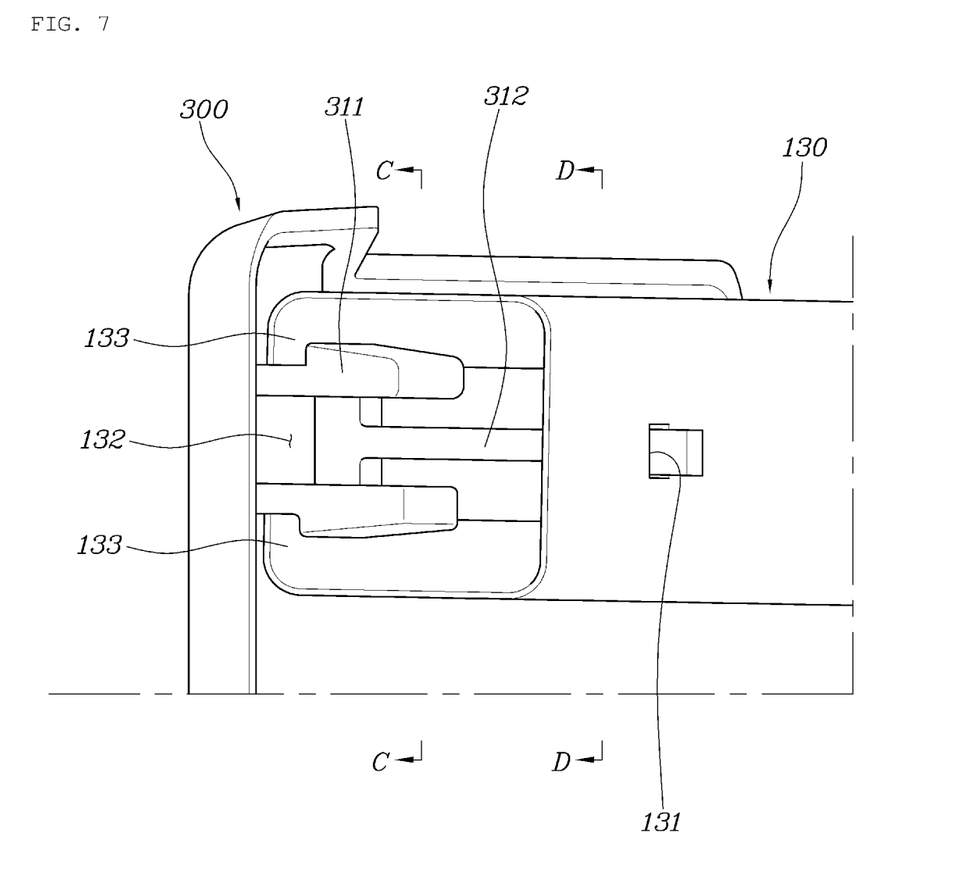
FIG. 7 is a perspective view illustrating a first fastening portion and a second fastening portion according to an embodiment of the present disclosure.
Figure 8:
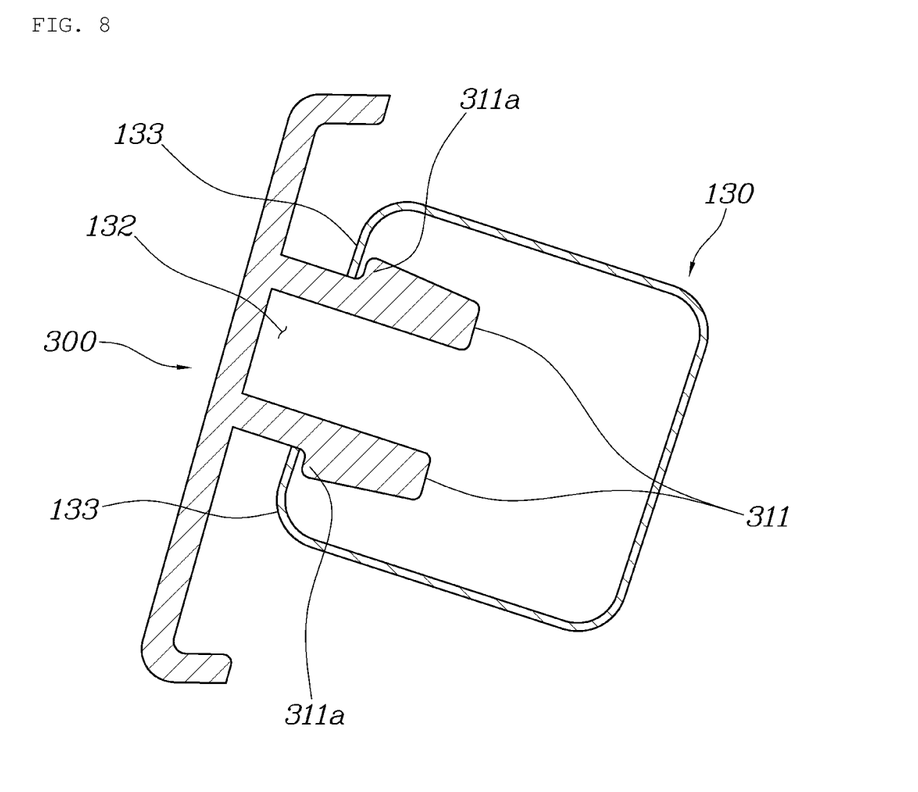
FIG. 8 is a cross-sectional view taken along line C-C of FIG. 7 and illustrating a first fastening portion according to an embodiment of the present disclosure.

FIG. 7 is a perspective view illustrating a first fastening portion 311 and a second fastening portion 312 according to an embodiment of the present disclosure, and FIG. 8 is a cross-sectional view taken along line C-C of FIG. 7 and illustrating the first fastening portion 311 according to an embodiment of the present disclosure.

In a first embodiment, the reinforcing pipe 130 may have an extension 133 extending and protruding from an end of the opening portion 132, and the fastening part 310 may include a first fastening portion 311 having an engaging step 311a that is inserted into the opening portion 132 so as to be engaged with the extension 133.

The reinforcing pipe 130 is provided with the extension 133 extending from the end of the opening portion 132, and the first fastening portion 311 is inserted into the reinforcing pipe 130 through the opening portion 132. In addition, the engaging step 311a provided in the first fastening portion 311 is formed to protrude in the opposite direction to the longitudinal direction of the extension 133, so that the first fastening portion 311 is inserted into the reinforcing pipe 130 so that the engaging step 311a is engaged with the extension 133, allowing the reinforcing panel 300 and the reinforcing pipe 130 to be fastened and coupled together.

As such, there is an effect that the reinforcing panel 300 can be prevented from moving in a direction crossing the extension direction of the reinforcing pipe 130 after the reinforcing panel 300 and the reinforcing pipe 130 are fastened to each other.

The outer surface of the first fastening portion 311 may be formed to be inclined in the insertion direction.

As illustrated in FIG. 8, the outer surface of the first fastening portion 311 is formed to be inclined so that the engaging step 311a may be formed at the end of the inclined portion on the reinforcing panel 300 side.

Accordingly, the first fastening portion 311 may be easily inserted first into the reinforcing pipe 130 through the opening portion 132, and after the first fastening portion 311 is completely inserted, the engaging step 311a is caught by the extension 133, so that the first fastening portion 311 may be fixed in the extension direction.

The extensions 133 may be provided in a pair at both ends of the opening portion 132 in a direction crossing the longitudinal direction of the reinforcing pipe 130, and the first fastening portions 311 may also be provided in a pair to correspond to the pair of extensions 133 for mutual engagement.

As illustrated in FIG. 8, the extensions 133 may be formed in a pair so as to extend from both ends of the opening portion 132, and the first fastening portions 311 may be provided to correspond to the pair of extensions 133 so that the first fastening portions are engaged with the extensions 133 on both sides, respectively, thereby providing the effect of preventing the fastening part 310 from moving in a direction opposite to the insertion direction of the fastening part and in an extension direction of the extension 133.

Figure 9:
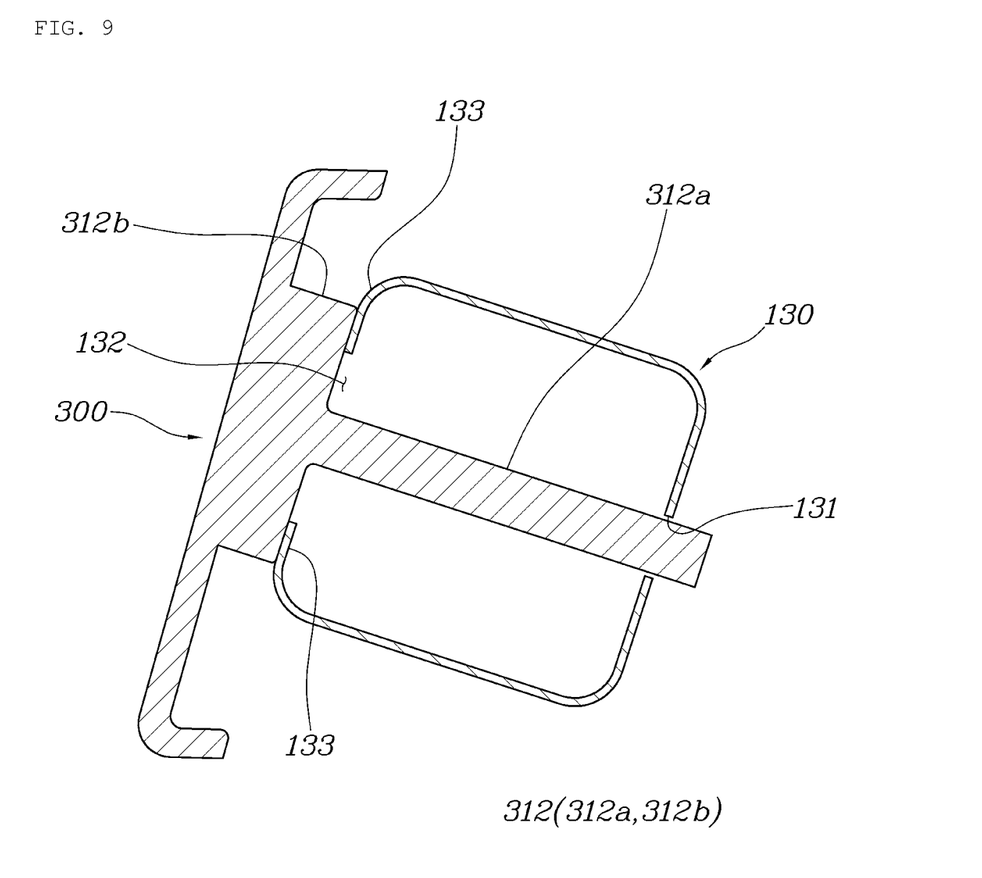
FIG. 9 is a cross-sectional view taken along line D-D of FIG. 7 and illustrating a second fastening portion according to an embodiment of the present disclosure.

FIG. 9 is a cross-sectional view taken along line D-D of FIG. 7 and illustrating a second fastening portion 312 according to an embodiment of the present disclosure.

In a second embodiment, the fastening part 310 may include a second fastening portion 312 having a protrusion 312a extending in a direction crossing the longitudinal direction of the reinforcing pipe 130 so as to be inserted into the opening portion 132, and the reinforcing pipe 130 may be provided with a through-hole 131 into which an end of the second fastening portion 312 is inserted at a surface facing the opening portion 132.

As illustrated in FIG. 7, the second fastening portion 312 may be located adjacent to the first fastening portion 311, and the second fastening portion 312 may have a protrusion 312a protruding from the reinforcing panel 300 toward the reinforcing pipe 130. The protrusion 312a may be inserted into the reinforcing pipe 130 through the opening portion 132.

The reinforcing pipe 130 may be provided with a through-hole 131 into which an end of the protrusion 312a is inserted is formed on the side facing the opening portion 132, which provides an effect that the protrusion 312a inserted into the reinforcing pipe 130 is prevented from moving in the longitudinal direction of the reinforcing pipe 130 in a state in which as the protrusion is inserted through the through-hole 131, the reinforcing panel 300 and the reinforcing pipe 130 are connected to each other.

The second fastening portion 312 may further include a support portion 312b that protrudes from the side of the reinforcing panel 300 to a width greater than the width of the opening portion 132 and is supported by the reinforcing pipe 130. The protrusion 312a may extend from an end of the support portion 312b.

When the protrusion 312a passes through the inside of the reinforcing pipe 130 and is inserted into the through-hole 131, the protrusion 312a and the reinforcing panel 300 may contact each other.

At this time, there is a possibility that the reinforcing panel 300 may be damaged due to an external force applied during worker's operation.

To prevent this, a support portion 312b protruding from the reinforcing panel 300 in a width greater than the width of the opening portion 132 may be provided, and the protrusion 312a may extend from an end of the support portion 312b.

As such, the protrusion 312a passes through the inside of the reinforcing pipe 130 and is inserted into the through-hole 131 and the support portion 312b comes into contact with the reinforcing pipe 130 to prevent the protrusion 312a from being inserted in the insertion direction thereof, thereby providing the effect of preventing damage to the reinforcing panel 300.

Figure 10:
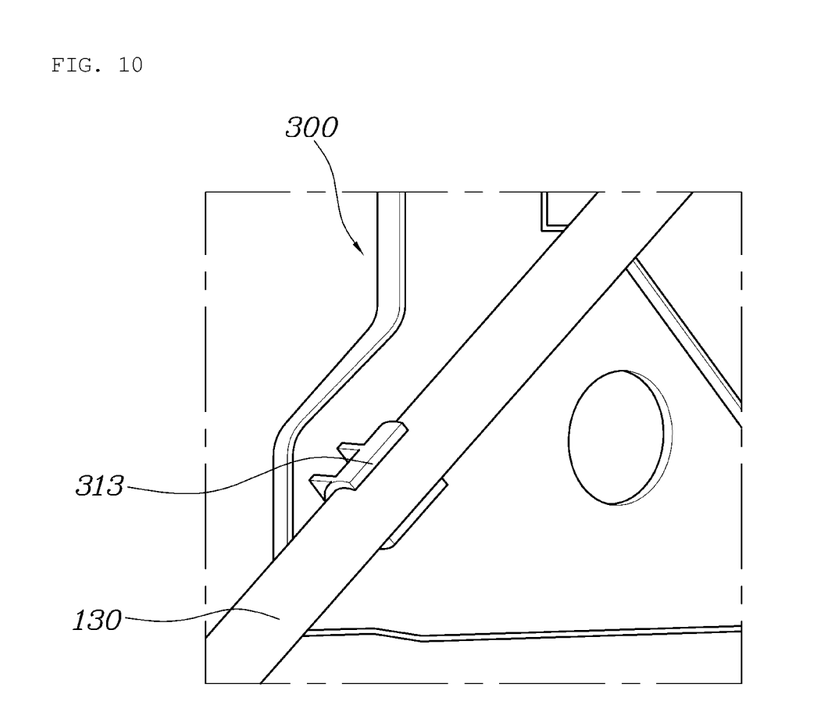
FIG. 10 is a perspective view illustrating a third fastening portion according to an embodiment of the present disclosure.

FIG. 10 is a perspective view illustrating a third fastening portion 313 according to an embodiment of the present disclosure.

The fastening part 310 may include a third fastening portion 313 formed to partially surround the outer circumferential surface of the reinforcing pipe 130 so that the reinforcing pipe 130 is inserted and fastened therein.

Referring further to FIG. 10, the third fastening portion 313 is formed to surround a portion of the outer circumferential surface of the reinforcing pipe 130 formed in a cylindrical shape from both lateral sides thereof, and the reinforcing pipe 130 can be fitted into the third fastening portion 313 that can surround the reinforcing pipe 130 at both ends thereof.

Accordingly, there is an effect that the reinforcing pipe and the third fastening portion can be coupled only by a worker's external force, which facilitates coupling therebetween. The reinforcing panel 300 may be made of a deformable synthetic resin material with inherent elasticity, and may be fixedly fitted with the reinforcing pipe 130.

In the vehicle panel assembly, respective panels are fitted with each other and coupled to the vehicle body by bolting (not shown) or rivets (R), and this assembly method can simplify the manufacturing process in which each panel is manufactured and transported to a smart factory, is assembled into a vehicle by a simple coupling method such as fitting, bolting, or riveting in the smart factory without a manufacturing process such as a press process and a painting process and is finally delivered to the customer, thereby minimizing the manufacturing cost.

Although the present disclosure has been described and illustrated with respect to the specific embodiments, those skilled in the art will appreciate that various improvements and modifications are possible, without departing from the scope and spirit of the present invention as disclosed in the accompanying claims.

What is claimed is:

1. A vehicle panel assembly comprising:
    an inner panel configured to be coupled to a vehicle body that comprises a plurality of pipes, the inner panel comprising a first coupling part capable of being fitted at an end thereof; and
    a reinforcing panel comprising a second coupling part coupled to the first coupling part and a fastening part extending toward a reinforcing pipe configured to be coupled to the vehicle body to reinforce the vehicle body, wherein the reinforcing panel is coupled to the inner panel through the second coupling part, and the fastening part is fitted with the reinforcing pipe to connect the inner panel and the reinforcing pipe, and wherein the reinforcing pipe has an opening portion with an open side, and the fastening part is inserted into the opening portion so as to be fastened to the reinforcing pipe.

2. The vehicle panel assembly according to claim 1, wherein the inner panel is coupled to the vehicle body by a bolt or a rivet.

3. The vehicle panel assembly according to claim 1, wherein the vehicle body comprises an upper body comprising a first plurality of pipes coupled to a lower body comprising a second plurality of pipes and the reinforcing pipe configured to reinforce the upper body, wherein the inner panel is configured to be coupled to the upper body, and the reinforcing panel connects the reinforcing pipe and the inner panel.

4. The vehicle panel assembly according to claim 1, wherein the reinforcing pipe comprises an extension extending from an end of the opening portion, and the fastening part comprises a first fastening portion having an engaging step inserted into the opening portion so as to be caught by the extension.

5. The vehicle panel assembly according to claim 4, wherein the extension is formed as a pair of extensions at both ends of the opening portion in a direction crossing a longitudinal direction of the reinforcing pipe, and the first fastening portion is formed as a pair to correspond to the pair of extensions for mutual engagement.

6. The vehicle panel assembly according to claim 1, wherein:
    the fastening part comprises a second fastening portion having a protrusion extending in a direction crossing a longitudinal direction of the reinforcing pipe so as to be inserted into the opening portion; and
    the reinforcing pipe comprises a through-hole into which an end of the second fastening portion is inserted at a surface opposite to the opening portion.

7. The vehicle panel assembly according to claim 6, wherein the second fastening portion further comprises a support portion protruding from a side of the reinforcing panel to a width greater than that of the opening portion and supported by the reinforcing pipe, and the protrusion extends from an end of the support portion.

8. The vehicle panel assembly according to claim 1, wherein the fastening part comprises a third fastening portion formed to partially surround an outer circumferential surface of the reinforcing pipe so that the reinforcing pipe is inserted and the third fastening portion is fastened to the inside of the reinforcing pipe.

9. A vehicle panel assembly comprising:
    an inner panel configured to be coupled to a vehicle body that comprises a plurality of pipes, the inner panel comprising a first coupling part capable of being fitted at an end thereof; and a reinforcing panel comprising a second coupling part coupled to the first coupling part and a fastening part extending toward a reinforcing pipe configured to be coupled to the vehicle body to reinforce the vehicle body;

wherein the reinforcing panel is coupled to the inner panel through the second coupling part;

wherein the fastening part is fitted with the reinforcing pipe to connect the inner panel and the reinforcing pipe;

wherein the first coupling part is recessed into the vehicle body; and wherein the second coupling part protrudes to correspond to a recessed shape of the first coupling part, so that the second coupling part is inserted and fitted into the first coupling part.

10. The vehicle panel assembly according to claim 9, wherein the inner panel is coupled to the vehicle body by a bolt or a rivet.

11. The vehicle panel assembly according to claim 9, wherein the fastening part comprises a third fastening portion formed to partially surround an outer circumferential surface of the reinforcing pipe so that the reinforcing pipe is inserted and the third fastening portion is fastened to the inside of the reinforcing pipe.

12. A method of assembling a vehicle, the method comprising:

coupling an inner panel to a vehicle body that comprises a plurality of pipes, the inner panel comprising a first coupling part fitted at an end thereof; and coupling a second coupling part of a reinforcing panel to the first coupling part, the reinforcing panel comprising a fastening part extending toward a reinforcing pipe coupled to the vehicle body to reinforce the vehicle body, wherein the reinforcing panel is coupled to the inner panel through the second coupling part, and the fastening part is fitted with the reinforcing pipe to connect the inner panel and the reinforcing pipe, and wherein the reinforcing pipe has an opening portion with an open side, and the fastening part is inserted into the opening portion so as to be fastened to the reinforcing pipe.

13. The method according to claim 12, wherein coupling the inner panel to the vehicle body comprises a bolting process or a riveting process.

14. The method according to claim 12, wherein the first coupling part is recessed into the vehicle body, and the second coupling part protrudes to correspond to a recessed shape of the first coupling part, so that the second coupling part is inserted and fitted into the first coupling part.

15. The method according to claim 12, wherein the vehicle body comprises an upper body comprising a first plurality of pipes coupled to a lower body comprising a second plurality of pipes and the reinforcing pipe reinforcing the upper body, wherein the inner panel is coupled to the upper body, and the reinforcing panel connects the reinforcing pipe and the inner panel.

16. The method according to claim 12, wherein the reinforcing pipe comprises an extension extending from an end of the opening portion, and the fastening part comprises a first fastening portion having an engaging step inserted into the opening portion and caught by the extension.

17. The method according to claim 16, wherein the extension is formed as a pair of extensions at both ends of the opening portion in a direction crossing a longitudinal direction of the reinforcing pipe, and the first fastening portion is formed as a pair to correspond to the pair of extensions for mutual engagement.

18. The method according to claim 12, wherein:

the fastening part comprises a second fastening portion having a protrusion extending in a direction crossing a longitudinal direction of the reinforcing pipe and inserted into the opening portion; and the reinforcing pipe comprises a through-hole into which an end of the second fastening portion is inserted at a surface opposite to the opening portion.

19. The method according to claim 18, wherein the second fastening portion further comprises a support portion protruding from a side of the reinforcing panel to a width greater than that of the opening portion and supported by the reinforcing pipe, and the protrusion extends from an end of the support portion.

20. The method according to claim 12, wherein the fastening part comprises a third fastening portion formed to partially surround an outer circumferential surface of the reinforcing pipe so that the reinforcing pipe is inserted and the third fastening portion is fastened to the inside of the reinforcing pipe.

* * * * *